United States Patent [19]

Cadee

[11] Patent Number: 4,592,457
[45] Date of Patent: Jun. 3, 1986

[54] INFINITELY VARIABLE V-BELT TRANSMISSION FOR A MOTOR VEHICLE

[75] Inventor: Theodorus P. M. Cadee, Goirle, Netherlands

[73] Assignee: Van Doorne'S Transmissie B.V., Tilburg, Netherlands

[21] Appl. No.: 610,796

[22] Filed: May 16, 1984

[51] Int. Cl.⁴ .......................................... F16D 43/284
[52] U.S. Cl. ............................... 192/0.076; 192/0.096; 192/103 F
[58] Field of Search ............... 192/0.032, 0.033, 0.076, 192/0.096, 85 A, 85 AA, 103 F

[56] References Cited

U.S. PATENT DOCUMENTS

| | | | |
|---|---|---|---|
| 3,411,416 | 11/1968 | Herd et al. | 137/117 |
| 3,862,676 | 1/1975 | Schall | 192/0.032 |
| 4,369,675 | 1/1983 | van Deursen | 74/864 |
| 4,466,521 | 8/1984 | Hattori et al. | 192/0.032 |

FOREIGN PATENT DOCUMENTS 2058251 4/1981 United Kingdom .

Primary Examiner—Rodney H. Bonck
Assistant Examiner—Richard M. Lorence
Attorney, Agent, or Firm—Cushman, Darby & Cushman

[57] ABSTRACT

A motor vehicle transmission includes an infinitely variable V-belt transmission having a primary (driving) pulley connected to an annular channel which is radially closed from the outside and into which a stationary pitot tube terminates for sensing the pressure of the fluid present in the channel in order to produce a fluid-pressure signal proportional to the speed of rotation of the primary pulley and further includes an input shaft which can be connected to the primary pulley through a fluid-pressure-operated driving away clutch. The input shaft of the transmission is connected to a second annular channel radially closed from the outside into which a second stationary pitot tube terminates for sensing the pressure of the fluid present in the second channel in order to produce a second fluid-pressure signal.proportional to the speed of rotation of the input shaft. A fluid pressure transmitting device continuously transmits the higher one of the two fluid-pressure signals and a control device responsive to the transmitted signal regulates the fluid pressure employed for the operation of the clutch.

2 Claims, 1 Drawing Figure

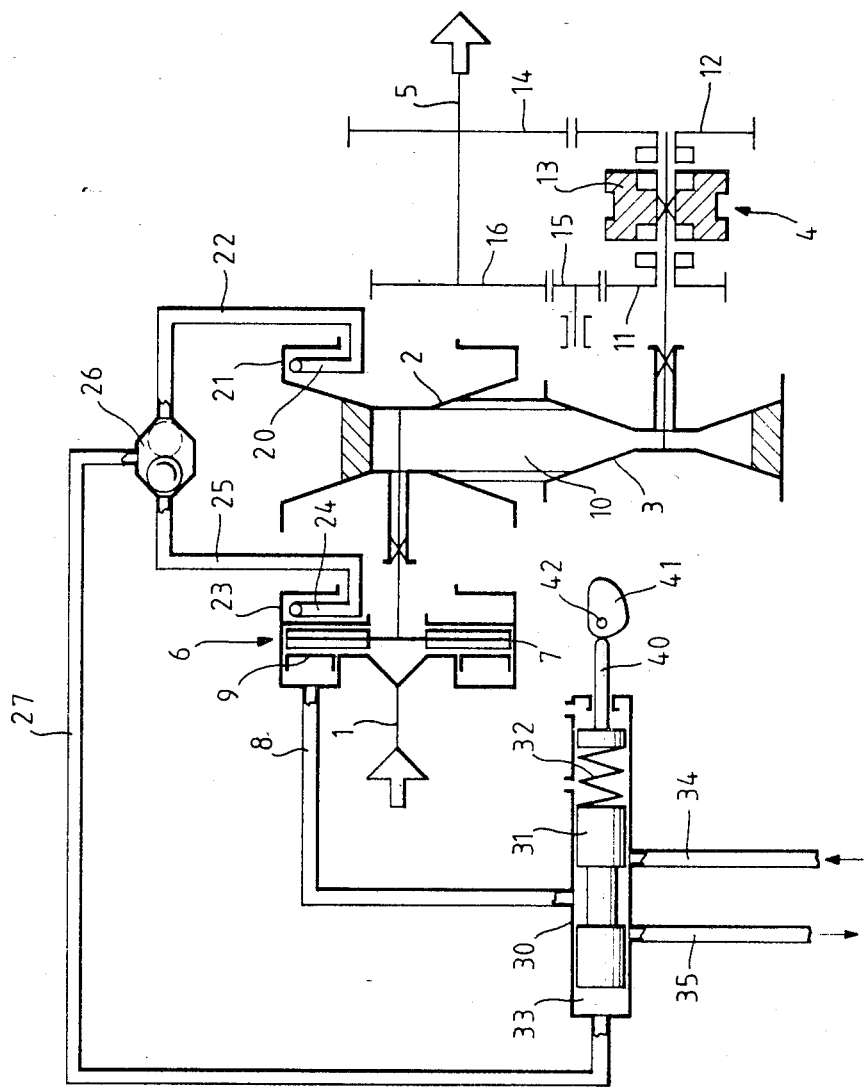

INFINITELY VARIABLE V-BELT TRANSMISSION FOR A MOTOR VEHICLE

The invention relates to an infinitely variable V-belt transmission of the kind having a primary (driving) pulley connected to an annular channel which is radially closed from the outside and into which a stationary pitot tube terminates for sensing the pressure of the fluid present in the channel in order to produce a fluid-pressure signal which depends on the speed of rotation of the primary pulley, the transmission having an input shaft which can be connected to the primary pulley through a driving-away clutch.

BACKGROUND AND SUMMARY OF THE INVENTION

In such a transmission, which is known from British Pat. No. 2 058 251, the driving-away clutch is a fluid coupling. If such a transmission were to be equipped with an engageable and disengageable plate clutch to serve as the driving-away clutch, operation of this clutch would give rise to problems, inasmuch as it is essential for such a plate-type clutch to engage smoothly under all conditions.

It is an object of the present invention to provide a transmission featuring a plate-type clutch as the driving-away clutch which permits effective operation of the clutch To this end, the plate-type clutch serving as the driving-away clutch is operated by fluid pressure and the input shaft of the transmission is connected to a second annular channel radially closed from the outside. A second stationary pitot tube terminates in the second annular channel for sensing the pressure of the fluid therein in order to produce a second fluid-pressure signal responsive to the speed of rotation of the input shaft. Also provided are a valve which continuously transmits the higher one of the two fluid-pressure signals and control means for regulating the fluid pressure employed for operation of the wet plate clutch in response to the fluid-pressure signal transmitted.

The use of a pitot tube, known as such, makes it possible in a simple fashion to obtain a hydraulic signal which depends on the angular velocity of the primary pulley (the first fluid-pressure signal) and the input shaft (the second fluid-pressure signal). The second fluid-pressure signal is a measure of the speed of the engine connected to the input shaft and it can be used as a control signal in normal driving away from standstill. In driving away, first the engine speed is increased by the depression of the accelerator pedal. The increased engine speed causes an increase of the second fluid-pressure signal and this signal effects the engagement of the driving-away clutch through the control means. As the vehicle, in driving away, starts moving from standstill the primary pulley will initially rotate slowly - more slowly than the input shaft as long as the driving-away clutch is not yet fully engaged. In consequence, the first fluid-pressure signal is low, in any case lower than the second fluid-pressure signal, so that the valve only transmits the second fluid-pressure signal in order to operate the driving-away clutch.

In driving down a slope, problems may arise if the second fluid-pressure signal is constantly used for operation of the driving-away clutch.

When, during driving, the vehicle speed, and hence the engine speed and also by inference the second fluid-pressure signal, drops to such a level that the driving-away clutch becomes disengaged (disconnected), the engine will run at tickover speed as long as the accelerator is not depressed. Now, if the vehicle goes faster down the slope again without the accelerator pedal being operated, the second fluid-pressure signal remains too low to effect engagement of the driving-away clutch, which would be desirable. The engagement of the driving-away clutch, being of critical importance under those conditions from safety considerations, will then be performed by the first fluid-pressure signal which depending on the vehicle speed will accordingly rise.

According to another feature of the invention, means are provided for influencing the control means in response to the position of the vehicle's accelerator pedal, in such a fashion that upon further depression of the accelerator pedal the engagement of the clutch occurs at a higher engine speed. Deeper depression of the accelerator pedal can be taken as a signal reflecting the wish to drive away faster. Engagement of the driving-away clutch at a higher engine speed promotes a faster take-off.

BRIEF DESCRIPTION OF THE DRAWING

The sole figure is a schematic representation of a transmission embodying the principles of the present invention.

DETAILED DESCRIPTION

The transmission illustrated in the drawing includes an input shaft 1, a primary pulley 2, a secondary pulley 3, a forward/reverse shift mechanism 4 and an output shaft 5.

The input shaft 1 is connected through a clutch 6 to the primary pulley 2. The clutch 6 includes a disc 7 which can be clamped by a cylinder 9 by means of fluid pressure in line 8, causing the input shaft 1 to be linked to the primary pulley 2.

A V-belt 10 is looped over the pulleys 2 and 3. The running diameter of belt 10 about the pulleys 2 and 3, can be changed such that the transmission ratio of the primary pulley 2 to the secondary pulley 3 may be adjusted.

The forward/reverse shift mechanism 4 is represented in the form of gears 11 and 12 which can be connected to the secondary pulley 3 by means of a displaceable shift member 13. This arrangement makes it possible to drive the output shaft 5 in one direction through the gears 12 and 14 and in the opposite direction through the gears 11, 15 and 16.

The drawing shows a first, stationary pitot tube 20 having an open end terminating in an annular channel 21 connected to the primary pulley 2. The annular channel 21, which is radially closed from the outside, is supplied with liquid which rotates in channel 21 with the primary pulley 2. This enables the pitot tube 20 to sense a fluid pressure signal which is transmitted through a line 22 to a check valve 26.

In corresponding fashion an annular channel 23 is connected to the input shaft 1, into which channel the open end of a second pitot tube 24 terminates for sensing a second fluid-pressure signal which is transmitted through a line 25 to the valve 26. The higher one of the two fluid-pressure signals is passed by the valve 26 to a control valve 30 via a line 27. To accomplish this function the valve 26 includes a housing 30a and an internal ball 30b which is movable between the connections of the lines 22 and 25 so as to block whichever connection is contacted by the ball 30b.

The control valve 30 comprises a housing and an internal slidable valve spool 31 which is loaded on one side by a spring 32 and on the other side by the fluid pressure in a space 33 between the spool 31 and the housing, this pressure being the higher one of the two fluid-pressure signals. Via line 34 fluid is supplied to the valve housing at a sufficient pressure to bring about engagement of the clutch 6. Depending on the position of the valve spool 31, fluid is either passed from the line 34 via line 8 to the clutch 6, or line 8 is placed in communication with a discharge line 35 whereupon the clutch 6 is disengaged.

It will be clear that when the fluid pressure sensed by one of the pitot tubes 20 and 24 is sufficiently high, the valve spool 31 body moves to the right so that the fluid pressure of line 34 can effect engagement of the clutch. In consequence, the drive-away clutch 6 is engaged both at a sufficient engine speed (fluid-pressure signal of the pitot tube 24) and at a sufficient vehicle speed (fluid-pressure signal of the pitot tube 20).

The spring 32 can be preloaded through an operating member 40 which is in contact with an operating cam 41 rotatable about a pivot 42. The rotation of the cam 41 can be linked to the displacement of the accelerator pedal 42 of the vehicle in such a fashion that upon deeper depression of the accelerator pedal 42 the cam 41 rotates to the right, so that the spring 32 is preloaded further. In that case, a higher fluid pressure in the space 33 is required to effect engagement of the clutch 6, so this engagement occurs at a higher fluid-pressure signal in the line 27 and, in consequence, at a higher engine speed.

What is claimed is:

1. In a motor vehicle transmission including an infinitely variable V-belt transmission having a primary pulley connected to an annular channel having a closed peripheral surface and into which a stationary pitot tube terminates for sensing the pressure of fluid present in the channel in order to produce a fluid-pressure signal proportional to the speed of rotation of the primary pulley, and including a driving-away clutch for connecting an input shaft to the primary pulley, the improvement wherein the driving-away clutch is a wet plate clutch operated by fluid pressures, the input shaft being connected to a second annular channel having a closed peripheral surface into which a second stationary pitot tube terminates for sensing the pressure of a fluid present in the second channel in order to produce a fluid-pressure signal proportional to the speed of rotation of the input shaft, means for continuously transmitting one of the fluid-pressure signals and control means responsive to the fluid-pressure signal transmitted by said transmitting means for regulating the fluid pressure employed for operating the wet plate clutch.

2. A transmission as in claim 1, wherein the control means comprise adjustment means to be operated by an accelerator pedal of a vehicle to render the driving-away clutch operating pressure dependent upon the input shaft speed.

* * * * *